Nov. 10, 1964     A. W. HUGHES, JR     3,156,468
GAME WITH COLOR SELECTIVE PARTS

Filed July 24, 1962

INVENTOR.
A. W. HUGHES, Jr.

BY

ATTORNEY

United States Patent Office 3,156,468
Patented Nov. 10, 1964

3,156,468
GAME WITH COLOR SELECTIVE PARTS
Alexander W. Hughes, Jr., Chicago, Ill.
(4323 Northfield Road, Cleveland 28, Ohio)
Filed July 24, 1962, Ser. No. 213,084
3 Claims. (Cl. 273—134)

This invention relates to games.

It is an object of the invention to provide an improved game.

According to one aspect of the invention there is provided a game comprising two groups of opposing pieces, the pieces of one group being of identical shape but of at least two colors; additionally, there are provided optical means to make all of the pieces of said one group appear to be of the same color.

According to a further aspect of the invention move indicator means is provided for selectively exhibiting characters indicating prescribed movements for the pieces of said one group with respect to a game board. These characters are of a color which is normally invisible through a mask which constitutes said optical means and means is provided to render said characters visible through the aforesaid mask.

According to a further feature of the invention a casing is provided for the aforesaid pieces and a window is provided in this casing which is of the same material as the aforesaid mask, the window exposing said pieces and making all of the pieces appear to be of the same color.

The invention will be more readily understood from the following detailed description as illustrated by the accompanying drawing in which:

FIGURE 1 diagrammatically illustrates a game board having pieces thereon in accordance with the invention;

Figure 1:
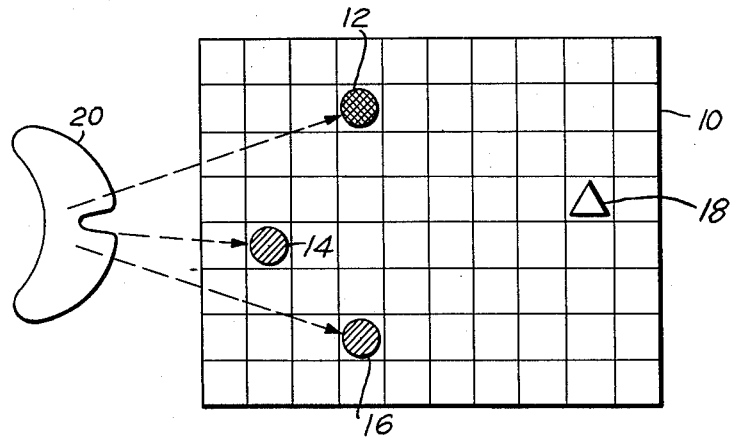

The game apparatus as illustrated in FIG. 1 comprises a game board 10 upon which are positioned movable pieces 12, 14, 16 and 18.

Pieces 12, 14 and 16 represent the pieces of one group and piece 18 is representative of a plurality of pieces which may constitute a second or opposing group.

One particular embodiment of the invention contemplates that pieces 12, 14 and 16 are fabricated in the form of foxes, whereas pieces such as piece 18 are fabricated in the form of horses with riders thereupon in hunting attire.

The pieces 12, 14 and 16 are all of the same shape but, as illustrated, pieces 14 and 16 are of one color, whereas piece 12 is of a different color. In a specific embodiment, pieces 14 and 16 are of light gray color, whereas piece 12 is of a red color.

According to the invention there is provided a mask 20 of a translucent colored material such as plastic adapted for making pieces 12, 14 and 16 appear to be of the same color. For this purpose, mask 20 constitutes an optical means of the same color as piece 12.

Mask 20 is adapted for being worn by the game player employing pieces 18, the intent being that this player be aware of the positions of pieces 12, 14 and 16 without being able to distinguish between the same.

Although applicable under many difficult circumstances, the preferred embodiment contemplated involves the movement of pieces 12, 14 and 16 toward a predetermined terminal position in the course of which they may be intercepted by pieces 18, a premium being awarded for intercepting the piece 12 which is of a particular distinguishable color.

Figure 2:
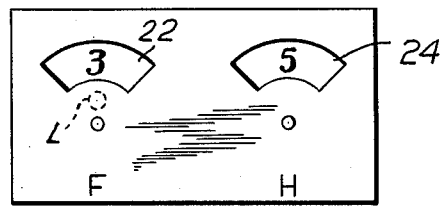
FIGURE 2 illustrates a move indicator device according to the invention.

In FIGURE 2 is shown a move indicator means for selectively exhibiting characters indicating prescribed movements of the pieces on the game board. The respective spinners 22 and 24 exhibit characters prescribing movements of the foxes and horses as indicated by the characters F and H in FIG. 2.

The characters of the spinner 22 are provided in such a color as to be invisible through the mask 20, the player employing pieces 12, 14 and 16 being entitled to call out the exhibited character on disc 22 or any other character he may desire subject to challenge by the operator or player employing pieces 18. Inasmuch as the characters exhibited on disc 22 are invisible to the player employing pieces 18 and inasmuch as he is employing mask 20, he may challenge his opponent as to the identification of the character exhibited by spinner 22.

To enable the player employing pieces 18 to determine what character is actually exhibited by disc 22, there is provided an illumination means L by which the characters may be selectively illuminated and thus made visible regardless of the application of mask 20. Thus, there is provided in accordance with the invention means to render the characters selectively visible through the aforesaid mask.

Figure 3:
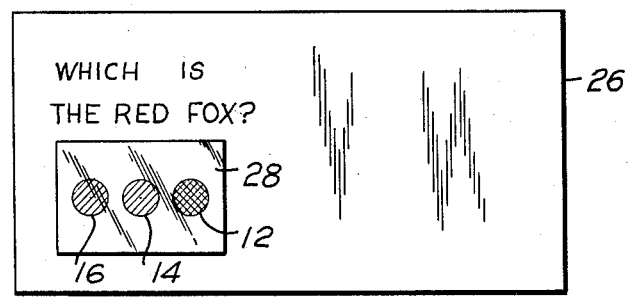
FIGURE 3 illustrates a casing for the components of the game.

The game board, move indicator means and pieces are stored in the casing 26 illustrated in FIG. 3. The pieces 12, 14 and 16 are exhibited through a window 28 which is fabricated of the same material as is the mask 20. Accordingly, pieces 12, 14 and 16 all appear to be of the same color until the cover of the casing 26 is removed.

Above the window 28 may be printed the legend "Which is the Red Fox?". This will serve to excite interest in the prospective purchaser especially if he is a juvenile.

There will now be obvious to those skilled in the art many modifications and variations of the structure set forth above. These modifications and variations will not depart from the scope of the invention as defined in the following claims.

What is claimed is:

1. A game comprising a game board having a plurality of playing positions indicated thereon, two groups of opposing pieces, the pieces of one group being of identical shape but of at least two colors, and optical means to make all of the pieces of said one group appear to be of the same color, said optical means being adapted for being used by one player at a time.

2. A game as claimed in claim 1 wherein said optical means is a mask of colored translucent material.

3. A game as claimed in claim 2 comprising a casing for said pieces and, in said casing, a window of the same material as said mask exposing said pieces.

References Cited in the file of this patent
UNITED STATES PATENTS

| | | |
|---|---|---|
| 2,801,856 | Medowar | Aug. 6, 1957 |
| 2,840,073 | Zeltzer et al. | June 24, 1958 |
| 2,995,375 | Deatherage | Aug. 8, 1961 |